United States Patent
Kwon et al.

(10) Patent No.: US 12,354,235 B2
(45) Date of Patent: Jul. 8, 2025

(54) METHOD AND APPARATUS WITH IMAGE RESTORATION

(71) Applicants: SAMSUNG ELECTRONICS CO., LTD., Suwon-si (KR); Seoul National University R&DB Foundation, Seoul (KR)

(72) Inventors: Kinam Kwon, Suwon-si (KR); Heewon Kim, Seoul (KR); Kyoung Mu Lee, Seoul (KR); Hyong Euk Lee, Suwon-si (KR)

(73) Assignees: Samsung Electronics Co., Ltd., Suwon-si (KR); Seoul National University R&DB Foundation, Seoul (KR)

( * ) Notice: Subject to any disclaimer, the term of this patent is extended or adjusted under 35 U.S.C. 154(b) by 915 days.

(21) Appl. No.: 17/380,648

(22) Filed: Jul. 20, 2021

(65) Prior Publication Data

US 2022/0237744 A1 Jul. 28, 2022

(30) Foreign Application Priority Data

Jan. 26, 2021 (KR) .................. 10-2021-0010638
Mar. 17, 2021 (KR) .................. 10-2021-0034480

(51) Int. Cl.
*G06T 5/00* (2024.01)
*G06F 18/214* (2023.01)
(Continued)

(52) U.S. Cl.
CPC ............ *G06T 5/00* (2013.01); *G06F 18/2148* (2023.01); *G06F 18/22* (2023.01); *G06N 3/08* (2013.01);
(Continued)

(58) Field of Classification Search
CPC ............ G06T 5/00; G06T 2207/20081; G06T 2207/20084; G06T 7/001; G06F 18/2148;
(Continued)

(56) References Cited

U.S. PATENT DOCUMENTS 11,222,224 B2 * 1/2022 Lee .................. G06F 18/214
2021/0248715 A1 * 8/2021 Schwartz ............... G06N 3/047
(Continued)

FOREIGN PATENT DOCUMENTS

KR   10-2022-0058143 A   5/2022

OTHER PUBLICATIONS

Lahiri, Avisek, et al. "Lightweight modules for efficient deep learning based image restoration." IEEE Transactions on Circuits and Systems for Video Technology 31.4 (2020): 1395-1410. (Year: 2020).*

(Continued)

*Primary Examiner* — Bobbak Safaipour
(74) *Attorney, Agent, or Firm* — NSIP Law

(57) ABSTRACT

A method with image restoration includes: receiving an input image and a first task vector indicating a first image effect among candidate image effects; extracting a common feature shared by the candidate image effects from the input image, based on a task-agnostic architecture of a source neural network; and restoring the common feature to a first restoration image corresponding to the first image effect, based on a task-specific architecture of the source neural network and the first task vector.

29 Claims, 13 Drawing Sheets

(51) Int. Cl.
 G06F 18/22 (2023.01)
 G06N 3/08 (2023.01)
 G06V 10/40 (2022.01)
(52) U.S. Cl.
 CPC .... *G06V 10/40* (2022.01); *G06T 2207/20081* (2013.01); *G06T 2207/20084* (2013.01)
(58) Field of Classification Search
 CPC ......... G06F 18/22; G06F 18/214; G06N 3/08; G06N 3/045; G06N 3/082; G06V 10/40
 See application file for complete search history.

(56) References Cited

U.S. PATENT DOCUMENTS

| | | | |
|---|---|---|---|
| 2021/0397946 A1* | 12/2021 | Choi | G06F 18/211 |
| 2022/0058803 A1* | 2/2022 | Bhattacharya | G06T 7/0014 |
| 2022/0084204 A1* | 3/2022 | Li | G06N 3/08 |
| 2022/0138924 A1 | 5/2022 | Kwon et al. | |
| 2022/0253642 A1* | 8/2022 | Choi | G06V 10/462 |
| 2024/0278423 A1* | 8/2024 | Ciocarlie | B25J 9/08 |
| 2025/0029212 A1* | 1/2025 | Bai | G06T 3/4046 |
| 2025/0029369 A1* | 1/2025 | Sun | G06T 5/60 |

OTHER PUBLICATIONS

Kim, Jiwon, Jung Kwon Lee, and Kyoung Mu Lee. "Accurate Image Super-Resolution Using Very Deep Convolutional Networks." Proceedings of the Conference on Computer Vision and Pattern Recognition. 2016 (9 pages in English).

Suganuma, Masanori, Xing Liu, and Takayuki Okatani. "Attention-Based Adaptive Selection of Operations for Image Restoration in the Presence of Unknown Combined Distortions." Proceedings of the CVF Conference on Computer Vision and Pattern Recognition, 2019 (10 pages in English).

Mittal, Anish et al. "Making a "Completely Blind" Image Quality Analyzer." 2012, IEEE Signal processing letters (4 pages in English).

Dong, Chao, et al. "Compression Artifacts Reduction by a Deep Convolutional Network." Proceedings of the IEEE International Conference on Computer Vision, 2015 (9 pages in English).

Wang, Xintao, et al. "Deep Network Interpolation for Continuous Imagery Effect Transition." Proceedings of the IEEE/CVF Conference on Computer Vision and Pattern Recognition, 2019 (10 pages in English).

Shoshan, Alon, Roey Mechrez, and Lihi Zelnik-Manor. "Dynamic-Net: Tuning the Objective Without Re-training for Synthesis Tasks." Proceedings of the IEEE/CVF International Conference on Computer Vision, 2019 (9 pages in English).

Yuan, Yuan, Wei Su, and Dandan Ma. "Efficient Dynamic Scene Deblurring Using Spatially Variant Deconvolution Network with Optical Flow Guided Training." Proceedings of the IEEE/CVF Conference on Computer Vision and Pattern Recognition, 2020 (10 pages in English).

Hou, Zejiang, and Sun-Yuan Kung. "Efficient Image Super Resolution Via Channel Discriminative Deep Neural Network Pruning." International Conference on Acoustics, Speech and Signal Processing (ICASSP). IEEE, 2020 (5 pages in English).

Lim, Bee, et al. "Enhanced Deep Residual Networks for Single Mage Super-Resolution." Proceedings of the IEEE conference on computer vision and pattern recognition workshops 2017 (9 pages in English).

Ahn, Namhyuk, Byungkon Kang, and Kyung-Ah Sohn. "Fast, Accurate, and Lightweight Super-resolution With Cascading Residual Network." (ECCV), 2018 (17 pages in English).

Agustsson et al. "Ntire 2017 Challenge on Single Image Super-Resolution: Dataset and Study." Proceedings of the IEEE conference on computer vision and pattern recognition workshops 2017 (10 pages in English).

Ledig, Christian, et al. "Photo-Realistic Single Image Super-Resolution Using a Generative Adversarial Network." Proceedings of the IEEE conference on computer vision and pattern recognition. 2017 (10 pages in English).

Chu, Xiangxiang, et al. "Fast, Accurate and Lightweight Super-Resolution with Neural Architecture Search." 25th International Conference on Pattern Recognition (ICPR). IEEE, Jul. 21, 2020 (6 pages in English).

Dong, Chao, et al. "Image Super-Resolution Using Deep Convolutional Networks." IEEE transactions on pattern analysis and machine intelligence, Jul. 31, 2015 (14 pages in English).

He, Jingwen et al. "Modulating Image Restoration with Continual Levels via Adaptive Feature Modification Layers." Proceedings of the IEEE/CVF Conference on Computer Vision and Pattern Recognition Jun. 3, 2019 (9 pages in English).

He, Jingwen et al. "Interactive Multi-Dimension Modulation with Dynamic Controllable Residual Learning for Image Restoration." 16th European Conference, Glasgow, UK, Aug. 23-28, 2020, Proceedings, Part XX 16. Springer International Publishing. Sep. 22, 2020 (16 pages in English).

Kim, Heewon, et al. "Fine-Grained Neural Architecture Search." arXiv:1911.07478, Nov. 18, 2019 (10 pages in English).

Liu, Hanxiao et al. "Darts: Differentiable Architecture Search." ICLR, Apr. 23, 2019 (13 pages in English).

Liu, Ming, et al. "Deep Adaptive Inference Networks For Single Image Super-Resolution." European Conference on Computer Vision, Apr. 8, 2020 (17 pages in English).

Martin, David, et al. "A Database of Human Segmented Natural Images and its Application to Evaluating Segmentation Algorithms and Measuring Ecological Statistics." vol. 2. IEEE, 2001 (8 pages in English).

Song, Dehua, et al. "Efficient Residual Dense Block Search for Image Super-Resolution." Proceedings of the AAAI Conference on Artificial Intelligence. vol. 34. No. 07, Dec. 30, 2019 (9 pages in English).

Wang, Wei, et al. "CFSNet: Toward a Controllable Feature Space for Image Restoration." Proceedings of the IEEE/CVF International Conference on Computer Vision, Aug. 20, 2019 (14 pages in English).

Xin, Jingwei, et al. "Binarized Neural Network for Single Image Super Resolution." European Conference on Computer Vision, 2020 (17 pages in English).

Yu, Ke, et al. "Crafting a Toolchain for Image Restoration by Deep Reinforcement Learning." Proceedings of the IEEE conference on computer vision and pattern recognition. Apr. 10, 2018 (10 pages in English).

Yu, Ke, et al. "Path-Restore: Learning Network Path Selection for Image Restoration." IEEE Transactions on Pattern Analysis and Machine Intelligence, Apr. 23, 2019 (10 pages in English).

Zhang, Kai, et al. "Beyond a Gaussian Denoiser: Residual Learning of Deep CNN for Image Denoising." IEEE transactions on image processing, Aug. 13, 2016 (13 pages in English).

Zhang, Kai, Wangmeng Zuo, and Lei Zhang. "FFDNet: Toward a Fast and Flexible Solution for CNN-Based Image Denoising." IEEE Transactions on Image Processing, May 22, 2018 (15 pages in English).

Zhang, Richard, et al. "The Unreasonable Effectiveness of Deep Features as a Perceptual Metric." Proceedings of the IEEE conference on computer vision and pattern recognition. Apr. 10, 2018 (14 pages in English).

Zhang, Yulun, et al. "Residual Dense Network for Image Super-Resolution." Proceedings of the IEEE conference on computer vision and pattern recognition. Mar. 27, 2018 (10 pages in English).

Kim, Heewon, et al. "Searching for Controllable Image Restoration Networks." arXiv:2012.11225, Dec. 21, 2020 (19 pages in English).

* cited by examiner

METHOD AND APPARATUS WITH IMAGE RESTORATION

CROSS-REFERENCE TO RELATED APPLICATIONS

This application claims the benefit under 35 USC § 119(a) of Korean Patent Application No. 10-2021-0010638 filed on Jan. 26, 2021, and Korean Patent Application No. 10-2021-0034480 filed on Mar. 17, 2021, in the Korean Intellectual Property Office, the entire disclosures of which are incorporated herein by reference for all purposes.

BACKGROUND

1. Field

The following description relates to a method and apparatus with image restoration.

2. Description of Related Art

Image restoration is a technology for restoring an image of degraded quality to an image of improved quality. Image restoration may be performed, for example, using a deep learning-based neural network. The neural network may be trained based on deep learning, and then perform inference for the desired purpose by mapping input data and output data that are in a nonlinear relationship to each other. Such a trained capability of generating the mapping may be referred to as a learning ability of the neural network. A neural network trained for a special purpose such as image restoration may have a generalization ability to generate a relatively accurate output in response to an input pattern that is not yet trained.

SUMMARY

This Summary is provided to introduce a selection of concepts in a simplified form that is further described below in the Detailed Description. This Summary is not intended to identify key features or essential features of the claimed subject matter, nor is it intended to be used as an aid in determining the scope of the claimed subject matter.

In one general aspect, a method with image restoration includes: receiving an input image and a first task vector indicating a first image effect among candidate image effects; extracting a common feature shared by the candidate image effects from the input image, based on a task-agnostic architecture of a source neural network; and restoring the common feature to a first restoration image corresponding to the first image effect, based on a task-specific architecture of the source neural network and the first task vector.

The restoring may include: determining a first task-specific network by applying the first task vector to the task-specific architecture; and restoring the common feature to the first restoration image, based on the first task-specific network.

The restoring may include: extracting a first specific feature specific to the first image effect from the common feature, based on the first task-specific network; and restoring the first specific feature to the first restoration image, based on the first task-specific network.

The determining of the first task-specific network may include: generating first channel selection information corresponding to the first task vector using an architecture control network; and determining the first task-specific network by removing a portion of channels of the task-specific architecture, based on the first channel selection information.

The generating of the first channel selection information may include: generating a first real vector by processing the first task vector through the architecture control network; and generating the first channel selection information by transforming each real element of the first real vector into true or false through a transformation function.

The extracting may include: determining a task-agnostic network by applying a shared parameter to the task-agnostic architecture; and extracting the common feature from the input image, based on the task-agnostic network.

The method may further include: receiving a second task vector corresponding to a second image effect among the candidate image effects; and restoring the common feature to a second restoration image corresponding to the second image effect, based on the task-specific architecture and the second task vector. The common feature may be reused for the restoring of the second restoration image.

The first task vector may include a control level of each effect type among effect types of the first image effect.

In another general aspect, a non-transitory computer-readable storage medium stores instructions that, when executed by a processor, cause the processor to perform the method described above.

In another general aspect, a training method includes: receiving a first training dataset comprising a first training input image, a first task vector indicating a first image effect among candidate image effects, and a first training target image corresponding to the first image effect; extracting a common feature shared by the candidate image effects from the first training input image, based on a task-agnostic architecture of a source neural network; restoring the common feature to a first restoration image, based on a task-specific architecture of the source neural network and the first task vector; and updating the source neural network, based on a difference between the first training target image and the first restoration image, and a computation amount associated with the extracting of the common feature and the restoring of the first restoration image.

The updating of the source neural network may include: updating the source neural network such that a number of layers comprised in the task-agnostic architecture increases and the computation amount decreases.

The first task vector may include a control level of each effect type among effect types of the first image effect. A value of the control level may be determined by a difference between an input effect level of the first training input image and a target effect level of the first training target image.

A second training dataset comprising a second training input image, a second task vector indicating a second image effect among the candidate image effects, and a second training target image corresponding to the second image effect may be provided. A difference between an input effect level of the second training input image and a target effect level of the second training target image may be the same as the difference between the input effect level of the first training input image and the target effect level of the first training target image. The second task vector may have a same value as the first task vector.

In another general aspect, a non-transitory computer-readable storage medium stores instructions that, when executed by a processor, cause the processor to perform the training method described above.

In another general aspect an electronic apparatus includes a processor configured to: receive an input image and a first task vector indicating a first image effect among candidate image effects; extract a common feature shared by the candidate image effects from the input image, based on a task-agnostic architecture of a source neural network; and restore the common feature to a first restoration image corresponding to the first image effect, based on a task-specific architecture of the source neural network and the first task vector.

The processor may be further configured to: determine a first task-specific network by applying the first task vector to the task-specific architecture; and restore the common feature to the first restoration image, based on the first task-specific network.

The processor may be further configured to: extract a first specific feature that is specific to the first image effect from the common feature, based on the first task-specific network; and restore the first specific feature to the first restoration image corresponding to the first image effect based on the first task-specific network.

The processor may be further configured to: generate first channel selection information corresponding to the first task vector using an architecture control network; and determine the first task-specific network by removing a portion of channels of the task-specific architecture, based on the first channel selection information.

The processor may be further configured to: generate a first real vector by processing the first task vector through the architecture control network; and generate the first channel selection information by transforming each real element among real elements of the first real vector into true or false through a transformation function.

The processor may be further configured to: determine a task-agnostic network by applying a shared parameter to the task-agnostic architecture; and extract the common feature from the input image, based on the task-agnostic network.

The processor may be further configured to: receive a second task vector corresponding to a second image effect among the candidate image effects; and restore the common feature to a second restoration image corresponding to the second image effect, based on the task-specific architecture and the second task vector. The common feature may be reused for the restoring of the second restoration image.

The electronic apparatus may further include a camera configured to generate the input image.

In another general aspect, an electronic apparatus includes one or more processors configured to: receive an input image and a first task vector indicating a first image effect among candidate image effects; extract a common feature shared by the candidate image effects from the input image, using a task-agnostic neural network; generate a first task-specific network by removing one or more channels of a task-specific architecture, based on the first task vector; extract, from the common feature, a first specific feature that is specific to the first image effect, using the first task-specific neural network; and restore the first specific feature to a first restoration image, using the first task-specific neural network.

The one or more processors are further configured to generate the task-agnostic network by applying a shared parameter to a task-agnostic architecture.

The one or more processors may be further configured to: generate a first real vector by processing the first task vector through an architecture control network; and generate first channel selection information used to remove the one or more channels of the task-specific architecture, by transforming each real element among real elements of the first real vector through a transformation function.

The one or more processors are further configured to: receive a second task vector indicating a second image effect among the candidate image effects; generate a second task-specific network by removing one or more other channels of the task-specific architecture, based on the second task vector; extract, from the common feature, a second specific feature that is specific to the second image effect, using the second task-specific neural network; and restore the second specific feature to a second restoration image, using the second task-specific neural network.

Other features and aspects will be apparent from the following detailed description, the drawings, and the claims.

BRIEF DESCRIPTION OF THE DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

Figure 1:
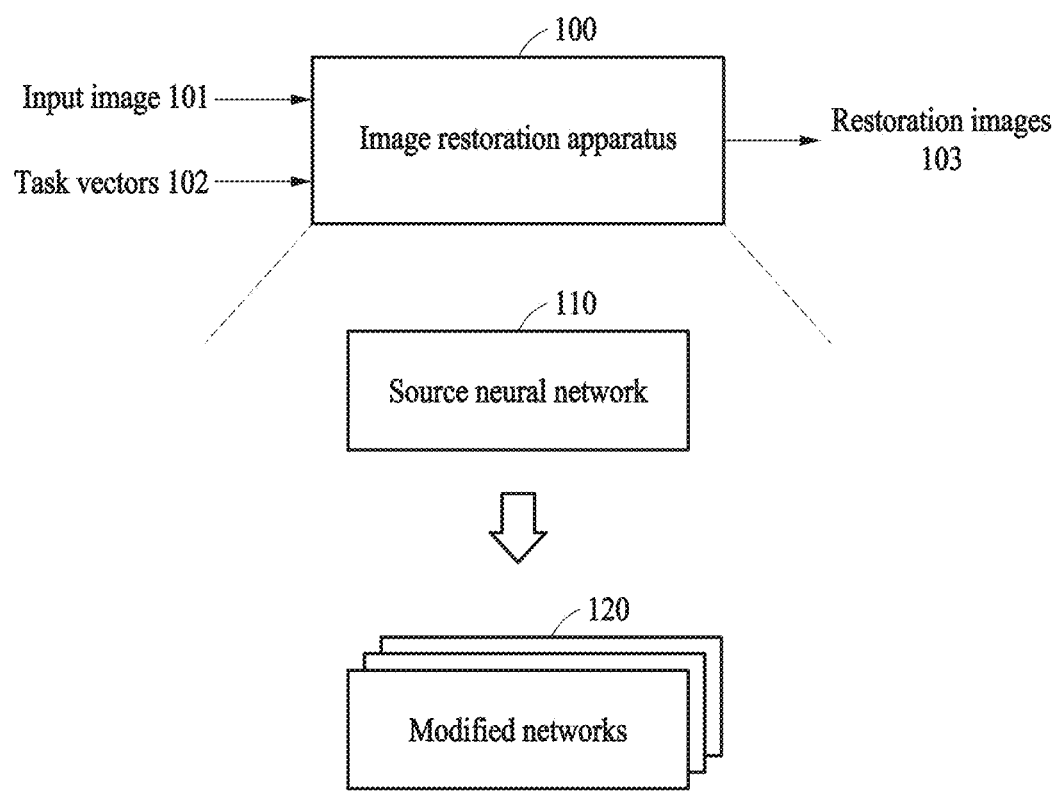
FIG. 1 illustrates an example of an overall operation of an image restoration apparatus.

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween.

As used herein, the term "and/or" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

The terminology used herein is for the purpose of describing particular examples only, and is not to be used to limit the disclosure. As used herein, the singular forms "a," "an," and "the" are intended to include the plural forms as well, unless the context clearly indicates otherwise. As used herein, the term "and/or" includes any one and any combination of any two or more of the associated listed items. As used herein, the terms "include," "comprise," and "have" specify the presence of stated features, numbers, operations, elements, components, and/or combinations thereof, but do not preclude the presence or addition of one or more other features, numbers, operations, elements, components, and/or combinations thereof.

In addition, terms such as first, second, A, B, (a), (b), and the like may be used herein to describe components. Each of these terminologies is not used to define an essence, order, or sequence of a corresponding component but used merely to distinguish the corresponding component from other component(s).

Herein, it is noted that use of the term "may" with respect to an embodiment or example, e.g., as to what an embodiment or example may include or implement, means that at least one embodiment or example exists in which such a feature is included or implemented while all examples and examples are not limited thereto.

Unless otherwise defined, all terms, including technical and scientific terms, used herein have the same meaning as commonly understood by one of ordinary skill in the art to which this disclosure pertains consistent with and after an understanding of the present disclosure. Terms, such as those defined in commonly used dictionaries, are to be interpreted as having a meaning that is consistent with their meaning in the context of the relevant art and the present disclosure, and are not to be interpreted in an idealized or overly formal sense unless expressly so defined herein.

Also, in the description of example embodiments, detailed description of structures or functions that are thereby known after an understanding of the disclosure of the present application will be omitted when it is deemed that such description will cause ambiguous interpretation of the example embodiments.

The features of the examples described herein may be combined in various ways as will be apparent after an understanding of the disclosure of this application. Further, although the examples described herein have a variety of configurations, other configurations are possible as will be apparent after an understanding of the disclosure of this application.

FIG. 1 illustrates an example of an overall operation of an image restoration apparatus. Referring to FIG. 1, an image restoration apparatus 100 receives an input image 101 and various task vectors 102, and outputs various restoration images 103. The task vectors 102 may correspond to various image effects. The task vectors 102 each may have one or more dimensions. Each of the dimensions may indicate an effect type and have a value that indicates a control level. The control level may indicate a magnitude of an effect level that is controlled by the task vectors 102. In terms of degradation, the effect type and the effect level may also be referred to as a degradation type and a degradation level, respectively. The task vectors 102 may be set in advance by a designer and/or operator of the image restoration apparatus 100 or set by a user when he/she uses the image restoration apparatus 100.

Effect types of various image effects may include, for example, a noise effect, a blur effect, a Joint Photographic Experts Group (JPEG) compression effect, a white balance effect, an exposure effect, a contrast effect, a lens distortion effect, and a combination of one or more thereof. For example, a first dimension of a task vector of three dimensions may indicate a noise effect and a value of the first dimension may indicate a noise level. In this example, a second dimension of the task vector may indicate a blur effect and a value of the second dimension may indicate a blur level. In this example, a third dimension of the task vector may indicate a JPEG compression effect and a value of the third dimension may indicate a JPEG compression level. However, examples are not limited to the foregoing example, and thus task vectors may have different dimensions, different effect types, and/or different effect levels.

Image restoration may include applying such an image effect. Under the assumption that a clear image is a high-quality image, image quality may be improved or degraded based on whether an image effect is applied or not. For example, image quality may be improved by a noise removal effect or degraded by a noise addition effect. The image restoration may enable such improvement and/or degradation of image quality.

The image restoration apparatus 100 applies the image effects indicated by the task vectors 102 to the input image 101 to generate the restoration images 103. The image restoration apparatus 100 determines modified networks 120 by applying the task vectors 102 to a source neural network 110, and generates the restoration images 103 using the modified networks 120. Using the source neural network 110 and the modified networks 120, the image restoration apparatus 100 may minimize operations (or computation) needed for the image restoration.

The source neural network 110 and the modified networks 120 may include a deep neural network (DNN) including a plurality of layers. The layers may include an input layer, at least one hidden layer, and an output layer.

The DNN may include at least one of a fully connected network (FCN), a convolutional neural network (CNN), or a recurrent neural network (RNN). For example, a portion of the layers included in the neural network may correspond to a CNN, and another portion of the layers may correspond to an FCN. In this example, the CNN may be referred to as a convolution layer, and the FCN may be referred to as a fully connected layer.

In the case of the CNN, data input to each layer may be referred to as an input feature map, and data output from each layer may be referred to as an output feature map. The input feature map and the output feature map may be referred to as activation data. For example, when the convolution layer corresponds to an input layer, an input feature map of the input layer may be an input image. In this example, an output feature map may be generated through a convolution operation between the input feature map and a weight kernel. The input feature map, the output feature map, and the weight kernel may be distinguished by a unit of a tensor.

After trained based on deep learning, the neural network may perform an inference that is suitable for a purpose for the training by mapping input data and output data that are in a nonlinear relationship to each other. Deep learning refers to a machine learning method used to solve an issue such as image or speech recognition from a big dataset. Deep learning may also be construed as an optimization problem-solving process that finds a point at which energy is minimized while training the neural network using prepared training data.

Through supervised or unsupervised learning of deep learning, a weight corresponding to an architecture or model of the neural network may be obtained. Through such a weight, the input data and the output data may be mapped. When the neural network has a sufficiently great width and depth, the neural network may have a capacity that is sufficient to implement a function. When the neural network learns a sufficiently great amount of training data through an appropriate training process, the neural network may achieve optimal performance.

The neural network may be expressed as being trained in advance, in which "in advance" means "before" the neural network is started. That the neural network is started may mean that the neural network is ready for an inference. For example, that the neural network is started may mean that the neural network is loaded in a memory, or input data for an inference is input to the neural network after the neural network is loaded in the memory.

The source neural network 110 may include a task-agnostic architecture, a task-specific architecture, and a control architecture. The task-agnostic architecture may extract, from the input image 101, a feature that is commonly used for respective tasks. This feature may be referred to herein as a common feature. The task-specific architecture may extract a feature that is specific to each task based on the common feature. This feature may be referred to herein as a specific feature. The task-specific architecture may restore the specific feature to a restoration image. The control architecture may determine each task-specific network based on each task vector and the task-agnostic architecture. The source neural network 110 and the modified networks 120 will be described in detail with reference to FIGS. 2 and 3.

Figure 2:
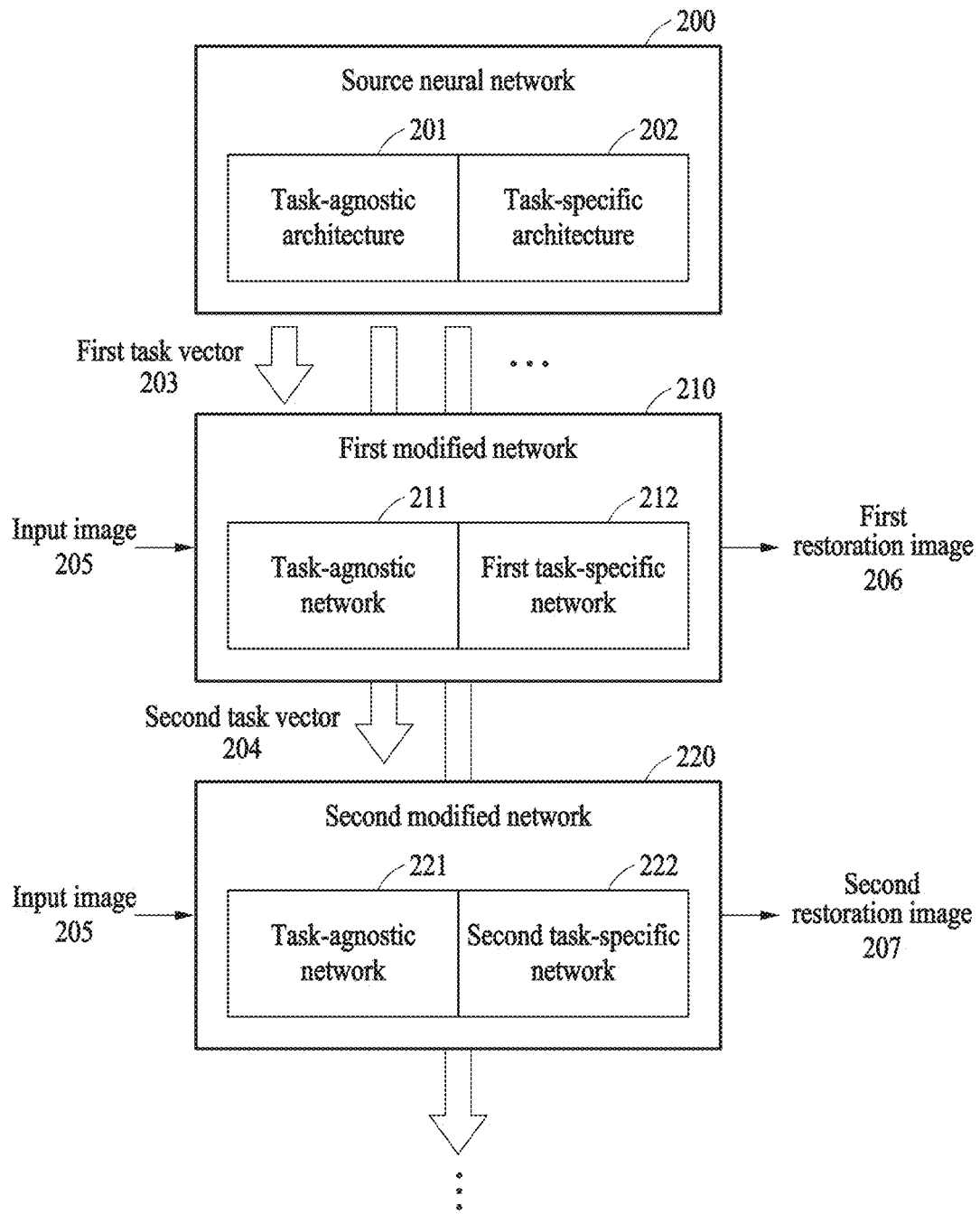
FIG. 2 illustrates an example of a source neural network and modified networks.

FIG. 2 illustrates an example of a source neural network and modified networks.

Referring to FIG. 2, a source neural network 200 includes a task-agnostic architecture 201 and a task-specific architecture 202. When a first task vector 203 is applied to the source neural network 200, a first modified network 210 may be generated. When a second task vector 204 is applied to the source neural network 200, a second modified network 220 may be generated. An additional modified network may also be generated based on an additional task vector, and the following description may also apply to the additional task vector and the additional modified network.

The first modified network 210 may restore (or generate) a first restoration image 206 based on an input image 205. The first modified network 210 includes a task-agnostic network 211 and a first task-specific network 212. The task-agnostic network 211 may be determined by applying a shared parameter to the task-agnostic architecture 201, and the first task-specific network 212 may be determined by applying the first task vector 203 to the task-specific architecture 202. For example, the first task-specific network 212 may be determined by performing channel pruning for the task-specific architecture 202 using the first task vector 203. Such pruning may enable a reduction in operations or computation. The task-agnostic network 211 may extract a common feature from the input image 205, and the first task-specific network 212 may extract, from the common feature, a first specific feature that is specific to a first image effect indicated by the first task vector 203. The first task-specific network 212 may restore the first specific feature to the first restoration image 206.

The second modified network 220 may restore (or generate) a second restoration image 207 based on the input image 205. The second modified network 220 includes a task-agnostic network 221 and a second task-specific network 222. The task-agnostic network 211 and the task-agnostic network 221 may be the same. The task-agnostic network 221 may be determined by applying a shared parameter to the task-agnostic architecture 201, and extract a common feature from the input image 205. The common feature may be the same as an output from the task-agnostic network 211. Thus, the output of the task-agnostic network 211 may be reused for restoration of the second restoration image 207, and an operation for determining the task-agnostic network 221 and a feature extracting operation of the task-agnostic network 221 may be omitted. The second task-specific network 222 may be determined by applying the second task vector 204 to the task-specific network 202. The second task-specific network 222 may extract, from the common feature, a second specific feature that is specific to a second image effect indicated by the second task vector 204, and restore the second specific feature to the second restoration image 207.

Figure 3:
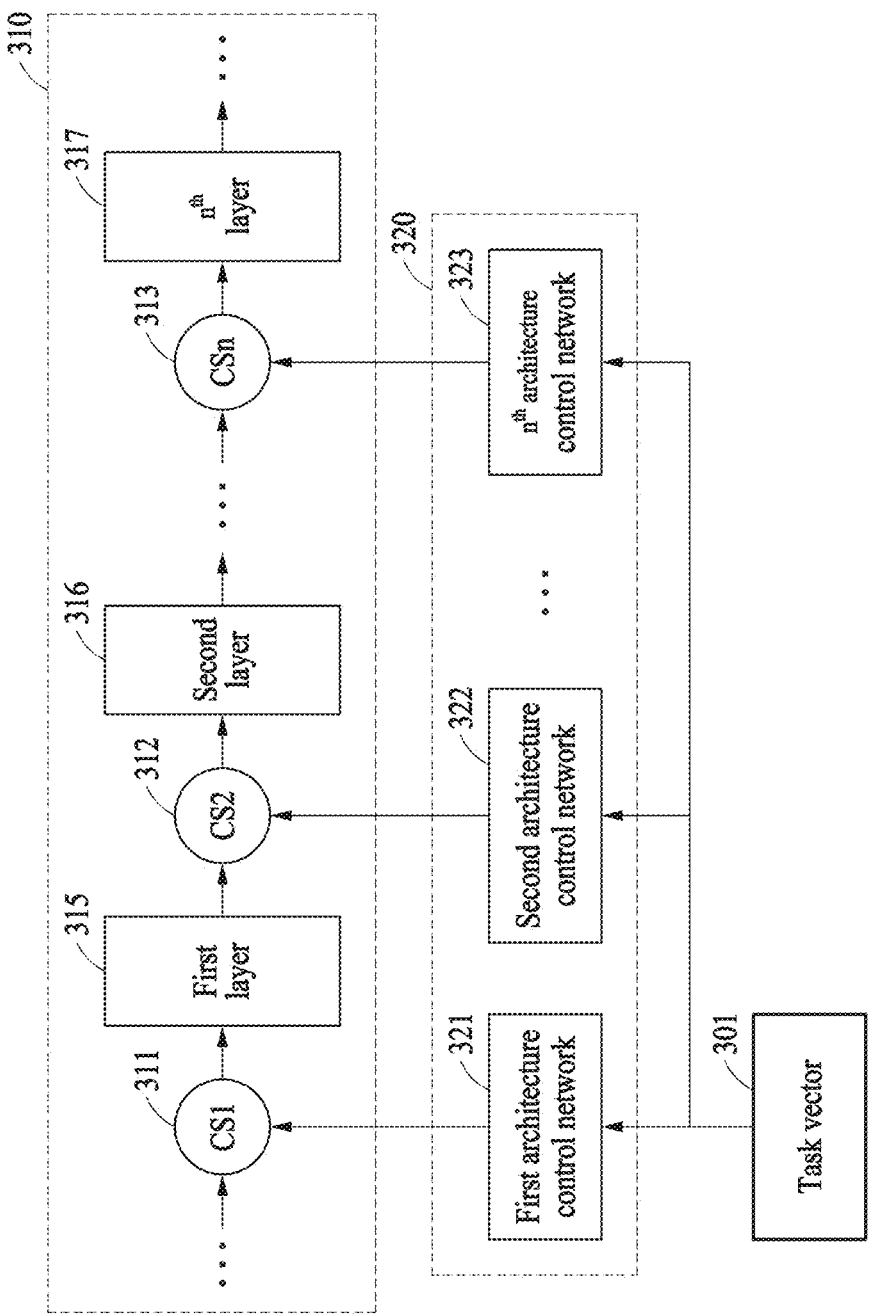
FIG. 3 illustrates an example of a task-specific architecture and a control architecture.

FIG. 3 illustrates an example of a task-specific architecture and a control architecture. Referring to FIG. 3, a task-specific architecture 310 includes a plurality of channel selectors 311, 312, . . . , 313, and a plurality of layers 315, 316, . . . , 317. A control architecture 320 includes a plurality of architecture control networks 321, 322, . . . , 323. Each of the architecture control networks 321 through 323 may include at least one convolution layer and at least one activation function. For example, the convolution layer may be a 1*1 convolution layer, and the activation function may be a rectified linear unit (ReLU) function. However, examples are not limited to the foregoing example, and other convolution layers of different dimensions other than 1*1, and/or a nonlinear function such as sigmoid and hyperbolic tangent (tan h) may be used. Respective pairs of the channel selectors 311 through 313 and the architecture control networks 321 through 323 may correspond to the layers 315 through 317, respectively.

An image restoration apparatus may determine a task-specific network by applying a task vector 301 to the task-specific architecture 310.

The image restoration apparatus may generate channel selection information associated with each of the layers 315 through 317 using the architecture control networks 321 through 323 and the channel selectors 311 through 313. Each of the architecture control networks 321 through 323 may determine a channel importance for a task, or a task preference for a channel, based on a task vector. The channel importance or the task preference may be in a form of a real vector. Respective channel importances output from the architecture control networks 321 through 323 may have different values. Each of the channel selectors 311 through 313 may generate the channel selection information based on the respective channel importances. Each of the channel selectors 311 through 313 may generate the channel selection information by transforming each real element of the real vector that indicates the channel importance into true or false. The channel selection information may be in a form of a binary vector.

The image restoration apparatus may determine a task-specific network corresponding to the task vector 301 based on the channel selection information of each of the layers 315 through 317. The image restoration apparatus may determine the task-specific network by applying channel pruning to each of the layers 315 through 317 based on the channel selection information. For example, in a case in which the first layer 315 has c output channels, at least a portion of the c output channels may be removed based on the channel selection information generated by the first channel selector 311. In this example, a channel corresponding to true of the channel selection information may be retained, and a channel corresponding to false of the channel selection information may be removed. The removing of a channel, or a channel removal, may also indicate skipping a channel, or a channel skip. For example, in a case in which a weight kernel is divided into a weight tensor corresponding to each output channel, the image restoration apparatus may not load, into a register, a weight tensor of a target channel to be removed, but perform a convolution operation of a corresponding layer with a weight tensor of a remaining channel. Through such a channel skip based on a specific task vector, for example, the task vector 301, the task-specific network that is specific to the task vector 301 may be implemented.

Figure 4:
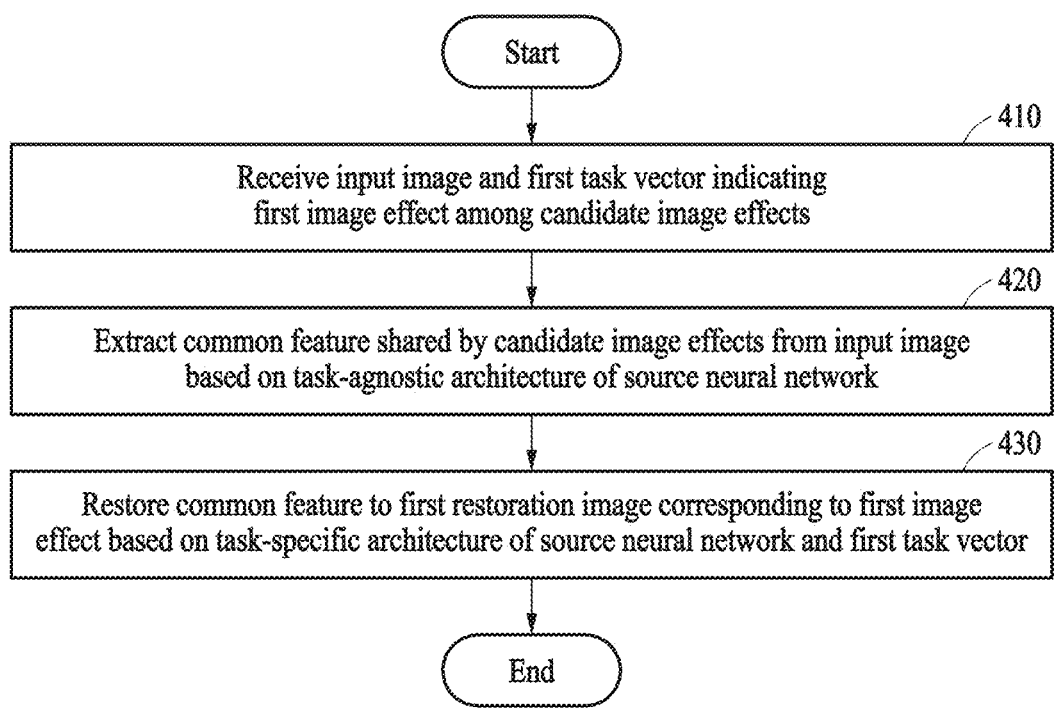
FIG. 4 illustrates an example of an image restoration method based on a first task vector.

FIG. 4 illustrates an example of an image restoration method based on a first task vector. Operations 410 through 430 to be described hereinafter with reference to FIG. 4 may be performed sequentially or non-sequentially. For example, the order in which operations 410 through 430 are performed may be changed, and/or at least two of operations 410 through 430 may be performed in parallel. Operations 410 through 430 may be performed by at least one component (e.g., a processor 1310 of FIG. 13 and a processor 1410 of FIG. 14) of an image restoration apparatus (e.g., the image restoration apparatus 100 of FIG. 1 and an image restoration apparatus 1300 of FIG. 13) and/or an electronic apparatus (e.g., an electronic apparatus 1400 of FIG. 14). Hereinafter, operations 410 through 430 will be described as being performed by an image restoration apparatus for simplicity of description.

Referring to FIG. 4, in operation 410, the image restoration apparatus receives an input image and a first task vector indicating a first image effect among a plurality of candidate image effects. In operation 420, the image restoration apparatus extracts a common feature shared by the candidate image effects from the input image based on a task-agnostic architecture of a source neural network. For example, a task-agnostic network may be determined by applying a shared parameter to the task-agnostic architecture, and the common feature may be extracted from the input image based on the task-agnostic network, in operation 420.

In operation 430, the image restoration apparatus restores the common feature to a first restoration image corresponding to the first image effect based on a task-specific architecture of the source neural network and the first task vector. For example, a first task-specific network may be determined by applying the first task vector to the task-specific architecture, and the common feature may be restored to the first restoration image based on the first task-specific network, in operation 430. In this example, a first specific feature that is specific to the first image effect may be extracted from the common feature based on the first task-specific network, and the first specific feature may be restored to the first restoration image corresponding to the first image effect based on the first task-specific network.

In addition, first channel selection information corresponding to the first task vector may be generated using an architecture control network. The first task-specific network may be determined by removing at least a portion of channels of the task-specific architecture based on the first channel selection information. The first task vector may be processed through the architecture control network to generate a first real vector, and the first channel selection information may be generated by transforming each real element of the first real vector into true or false through a transformation function.

Operations 410 through 430 may also be performed for image restoration based on a second task vector. For example, the image restoration apparatus may receive a second task vector corresponding to a second image effect among a plurality of candidate image effects, and restore a common feature to a second restoration image corresponding to the second image effect based on the task-specific architecture and the second task vector. The common feature may correspond to the common feature extracted in operation 420 described above, and may be reused for the restoration of the second restoration image. When a common feature is extracted from an input image, the common feature may be reused to generate (or restore) restoration images of various image effects in response to the same input image. Through such reuse, an operation for feature extraction may be reduced. For a more detailed example description of image restoration, reference may be made to that which is described with reference to FIGS. 1 through 3 and 5 through 14.

Figure 5:
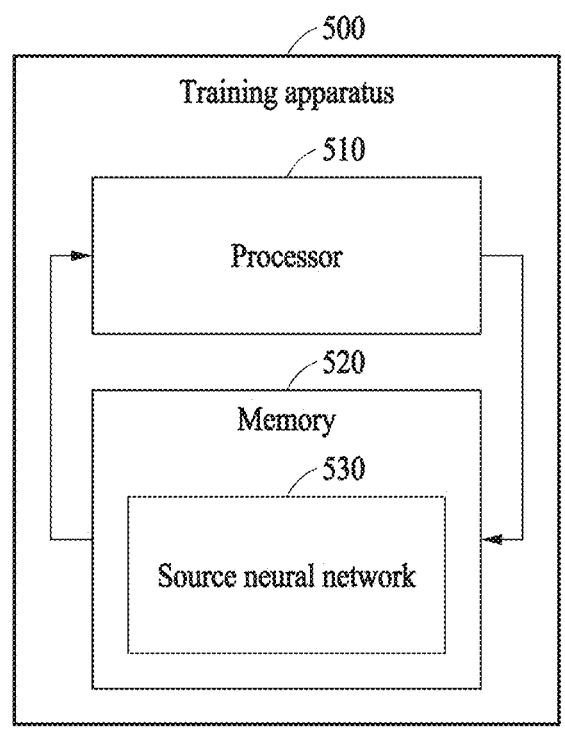
FIG. 5 illustrates an example of a training apparatus.

FIG. 5 illustrates an example of a training apparatus. Referring to FIG. 5, a training apparatus 500 includes a processor 510 and a memory 520. The processor 510 may train a source neural network 530 stored in the memory 520 based on training data. The training of the source neural network 530 may include updating the source neural network 530 and/or updating a parameter (e.g., a weight) of the source neural network 530. The source neural network 530 may be trained in advance and/or trained on-device during use of the source neural network 530. The training data may include a training input and a training output. The training output may also be referred to as a training target. The training input may include a training input image and a task vector, and the training output may include a training target image.

The source neural network 530 may include a task-agnostic architecture, a task-specific architecture, and a control architecture. The training apparatus 500 may search for an effective architecture through task-specific pruning and task-agnostic pruning. The task-specific pruning may enable learning how to adaptively remove a network parameter irrelevant to each task. The task-agnostic pruning may enable learning how to find an effective architecture by sharing an initial layer of a network throughout various tasks.

Controllable image restoration or image modulation may restore different images of different effects for each effect type. For example, in a case in which there are D effect types, a task vector $t_m \in \mathbb{R}^D$ may encode an mth image restoration task, that is, an mth image effect $m \in \{1, 2, \ldots, M\}$, and each dth element of $t_m$ ($t_{m,d} \in [0, 1]$) may determine a control level for a corresponding dth degradation type. During training of a neural network, the task vector $t_m$ may be randomly sampled along with a corresponding training pair of an input image and a target image. During an inference, the task vector $t_m$ may correspond to a control variable that determines an image effect.

For a real degraded image, it may be assumed that there is not known an optimal task vector for generating a best image effect with respect to a predetermined measurement value (e.g., peak signal-to-noise ratio (PSNR), learned perceptual image patch similarity (LPIPS), user preference, etc.). Thus, to find such a task vector, there may be required a process or operation in which a controllable image restoration network generates a great number of image effects per input image. In such a case, an arbitrary number of image effects generated for a given task until a user preference or request is satisfied may be indicated as M.

An entire network inference may be performed per image effect with an architecture of a previous task being in a fixed state. According to an example embodiment, there may be provided a network architecture that accurately generates various image effects per input image while minimizing a computation cost of a restoration process. An average computation cost for generating given M image effects may be represented by Equation 1.

$$\mathcal{R}_{total}(f, x) = \frac{1}{M} \cdot \sum_{m=1}^{M} \mathcal{R}(f, x, t_m) \qquad \text{Equation 1}$$

In Equation 1, $\mathcal{R}(f, x, t_m)$ denotes floating-point operations per second (FLOPS) or latency for generating an mth image effect using a network architecture f, an input image x, and a task vector $t_m$. The task-specific pruning may search for an effective network architecture that is specific to each image effect. This may indicate an average computation cost as represented by Equation 2.

$$\mathcal{R}_{total}^{TS}(f, x) = \frac{1}{M} \cdot \sum_{m=1}^{M} [\mathcal{R}(f_m, x, t_m) + \epsilon_m] \qquad [\text{Equation 2}]$$

The fixed architecture f may be replaced with an effective network $f_m$ specific to the mth image effect that has an auxiliary computation cost $E_m$ needed for the task-specific pruning. Subsequently, the task-agnostic pruning may determine a task-agnostic architecture $f^a$ that shares a feature map of an initial layer throughout whole tasks to enable reuse of a feature. This may be represented by Equation 3.

$$f_m(x, t_m) \approx f_m^s(f^a(x), t_m) \qquad \text{Equation 3}$$

$$= f_m^s(\tilde{x}, t_m),$$

In Equation 3, $f_m^s$ denotes a remaining task-specific layer of $f_m$ after $f^a$, and $\tilde{x}$ denotes a feature map output of $f^a(x)$. The feature map output may correspond to a common feature of respective tasks. Thus, for all M image effects, a single computation or calculation of $\tilde{x}$ may be requested, and duplicate M−1 computations or calculations with respect to the feature map of the shared initial layer may be removed. This may be represented by Equation 4.

$$\mathcal{R}_{total}^{TA+TS}(f, x) = \frac{1}{M} \cdot \mathcal{R}(f^a, x) + \mathcal{R}_{total}^{TS}(f^s, \tilde{x}) \qquad \text{Equation 4}$$

In Equation 4, $\mathcal{R}(f^a, x)$ denotes a computation cost for a single computation or calculation with respect to $f^a$. The training apparatus 500 may train the source neural network 530 based on a loss function. The loss function may include a first loss component associated with a restoration performance, and a second loss component associated with a computation amount or operation amount. The training apparatus 500 may train the source neural network 530 to improve the restoration performance of the source neural network 530 and reduce the computation amount associated with the source neural network 530. For example, the training apparatus 500 may compare, to a training output (or a training target image), an output (or a restoration image) of the source neural network 530 in response to a training input (or a training input image and a task vector), and determine the first loss component of the loss function based on a result of the comparing. In addition, the training apparatus 500 may train the source neural network 530 to reduce the computation amount while minimizing a loss of the restoration performance. For example, such a reduction in the computation amount may be achieved by increasing the number of layers included in the task-agnostic architecture and/or the number of channels to be removed from the task-specific architecture.

A search algorithm of the training apparatus 500 may be a supernetwork-based approach that aims to find an effective or optimal network per performance from a large network referred to as a supernetwork. A search process may be performed in a search space of an operation or a component or element, and each combination of the search process may provide a candidate network derived from the supernetwork. The source neural network 530 may correspond to the supernetwork, and modified networks derived from the source neural network 530 may correspond to candidate networks. For example, the training apparatus 500 may determine whether a layer needs to be shared between tasks and whether a channel needs to be removed from the supernetwork, in an end-to-end manner along with an architecture controller.

Figure 6:
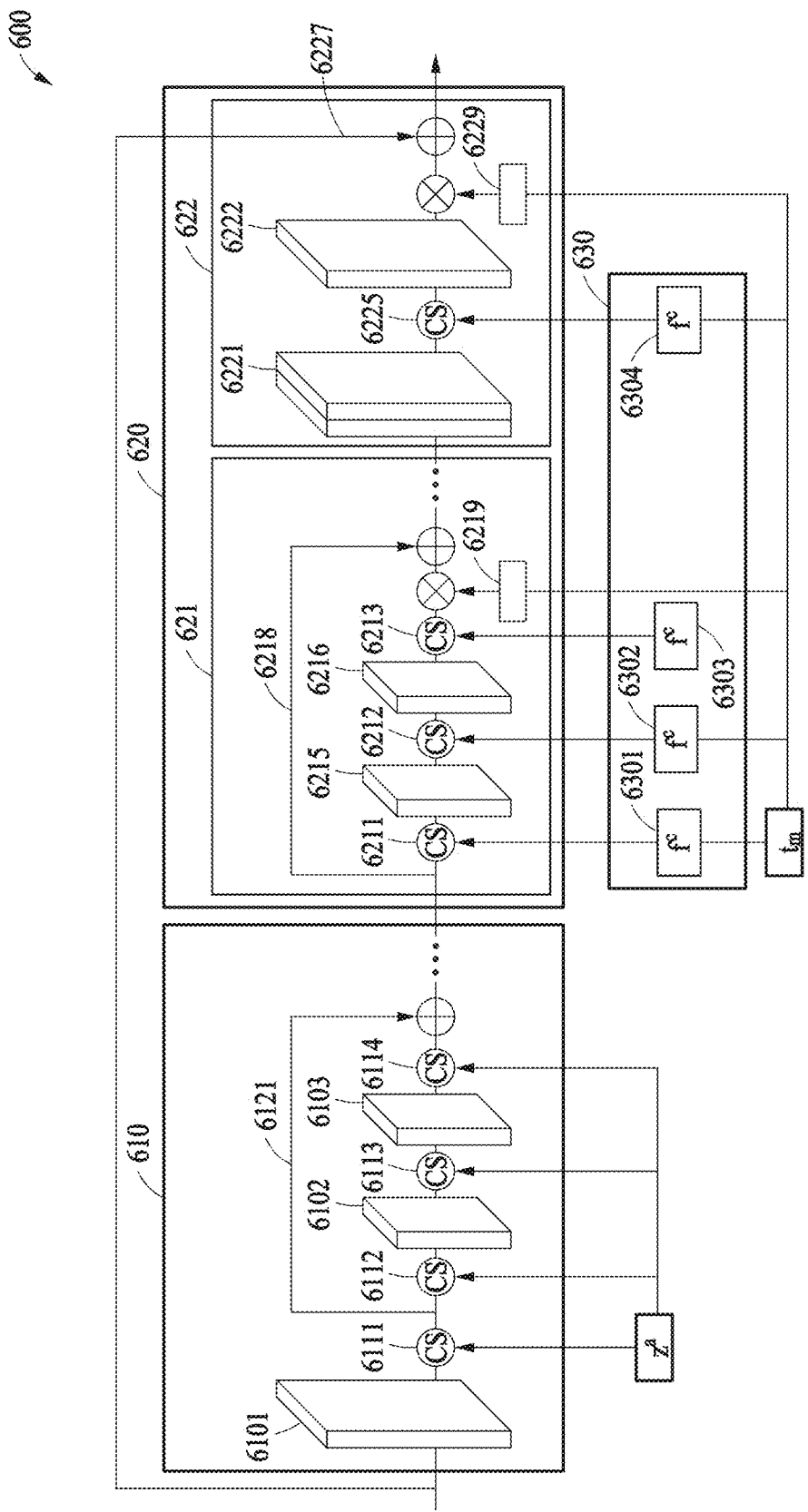
FIG. 6 illustrates an example of an architecture of a source neural network.

FIG. 6 illustrates an example of an architecture of a source neural network. Referring to FIG. 6, a source neural network 600 may include, for example, a task-agnostic architecture 610, a task-specific architecture 620, and a control architecture 630. The task-agnostic architecture 610 may include a plurality of layers 6101 through 6103 and a plurality of channel selectors 6111 through 6114. The task-agnostic architecture 610 may further include a skip connection 6121 corresponding to an operation of adding an output of the channel selector 6111 to an output of the channel selector 6114. The layers 6101 through 6103 may correspond to a convolution operation and/or an operation of an activation function. For example, the layers 6101 and 6103 may correspond to a 3*3 convolution operation, and the layer 6102 may correspond to a 3*3 convolution operation and an activation operation (e.g., an ReLU operation). A stride of the layer 6101 may be greater by a factor of 2 of the layers 6102 and 6103. Such quantities as 3*3 and/or factor of 2 may be adjusted differently.

The task-specific architecture 620 includes, for example, a feature extraction part 621 and an image restoration part 622. The feature extraction part 621 may include a plurality of channel selectors 6211 through 6213 and a plurality of layers 6215 and 6216. The feature extraction part 621 may further include a multiplication operation that multiplies an output of the channel selector 6213 by a convolution result of a task vector $t_m$ by a convolution block 6219 and an addition operation that adds an output of the task-agnostic architecture 610 to a result of the multiplication operation through a skip connection 6218. The layers 6215 and 6216 may correspond to a convolution operation and/or an operation of an activation function. For example, the layer 6215 may correspond to a 3*3 convolution operation and an activation operation (e.g., an ReLU operation), and the layer 6216 may correspond to a 3*3 convolution operation. A stride of the layers 6215 and 6216 may be the same as that of the layers 6102 and 6103.

The image restoration part 622 includes a plurality of layers 6221 and 6222 and a channel selector 6225. The image restoration part 622 further includes a multiplication operation that multiplies an output of the layer 6222 by a convolution result of a task vector $t_m$ by a convolution block 6229 and an addition operation that adds an input of the task-agnostic architecture 610 to a result of the multiplication operation through a skip connection 6227. The control architecture 630 includes a plurality of architecture control networks 6301 through 6304. The layers 6221 and 6222 may correspond to at least one of a convolution operation, an operation of an activation function, or a pixel shuffle operation. For example, the layer 6221 may correspond to a *2 pixel shuffle operation, a 3*3 convolution operation, and an activation operation (e.g., an ReLU operation), and the layer 6222 may correspond to a 3*3 convolution operation. Through the twofold stride of the layer 6101 and the twofold pixel shuffle of the layer 6221, the size of an input image and an output image may be maintained the same.

A training apparatus may search for an effective network by determining whether each channel is important for a given task or all tasks, or nothing. To find the task-specific architecture 620, a channel important for the given task may be maintained and a channel irrelevant to the task may be removed. Hereinafter, a task-specific architecture will also be indicated as $f^s$. Similarly, in the case of the task-agnostic architecture 610, a channel important for most tasks may be maintained and a channel irrelevant to the tasks may be removed. Hereinafter, a task-agnostic architecture will also be indicated as $f^a$. Which may be determined by a channel importance for a task, or a task preference for a channel, $z^a \in \mathbb{R}^{N \times C}$ and $z_m{}^s \in \mathbb{R}^{N \times C}$. The channel importance $z_m{}^s$ may correspond to an output of the control architecture 630. Although to be described hereinafter, the channel importance $z^a$ may be determined based on the channel importance $z_m{}^s$. Here, m, N, and C denote a task index, a channel selection module index, and a channel index, respectively.

Figure 7:
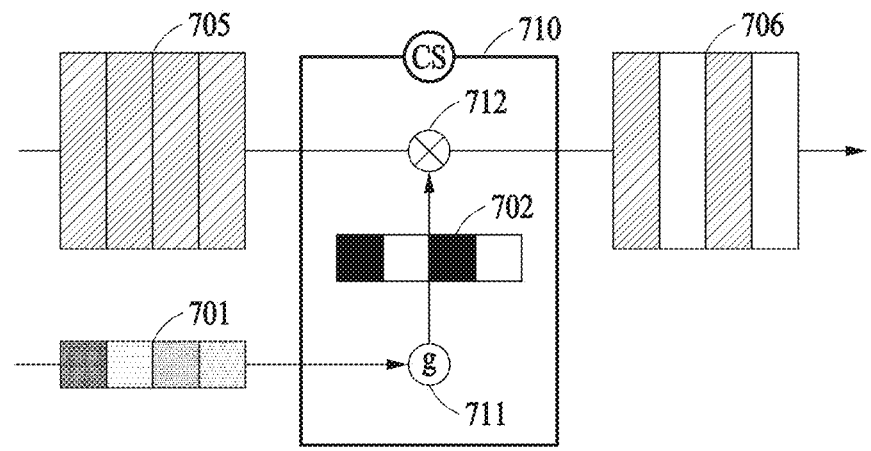
FIG. 7 illustrates an example of a channel selection operation.

FIG. 7 illustrates an example of a channel selection operation. Referring to FIG. 7, a channel selector 710 may determine a modified feature map 706 by transforming a channel importance 701 into channel selection information 702 and selecting (or removing) at least a portion of channels from a super feature map 705 based on the channel selection information 702. The channel importance 701 may correspond to a real vector, and the channel selection information 702 may correspond to a binary vector. The channel selector 710 may determine the binary vector by transforming each real element of the real vector into true or false through a transformation function 711. The transformation function 711 may correspond to a differentiable gating function that is represented by Equation 5.

$$g(z^*) = \begin{cases} \mathbb{1}[z^* > 0] & \text{if forward} \\ \text{sigmoid}(z^*) & \text{if backward} \end{cases} \quad \text{Equation 5}$$

In Equation 5, $* \in \{a, s\}$, and $z^*$ denotes a component of $\mathbb{1}_m{}^*$. [•] denotes an indicator function that returns 1 when an input is true, and returns 0 otherwise. Thus, each parameter of $\mathbb{1}_m{}^s$ and $z^a$ may be determined such that a corresponding channel is to be activated or inactivated in a supernetwork with respect to $f^s$ and $f^a$. During training, the modified feature map 706 may be generated by multiplying the super feature map 705 by the channel selection information 702 through a multiplication operation 712. During an inference, the multiplication operation 712 may be replaced with skip processing, and thus a reduction in a computation amount may be achieved. For example, a load of a weight tensor corresponding to false of the channel selection information 702 may be skipped and only a weight tensor corresponding to true may be selectively loaded to be used for a convolution operation.

Figure 8:
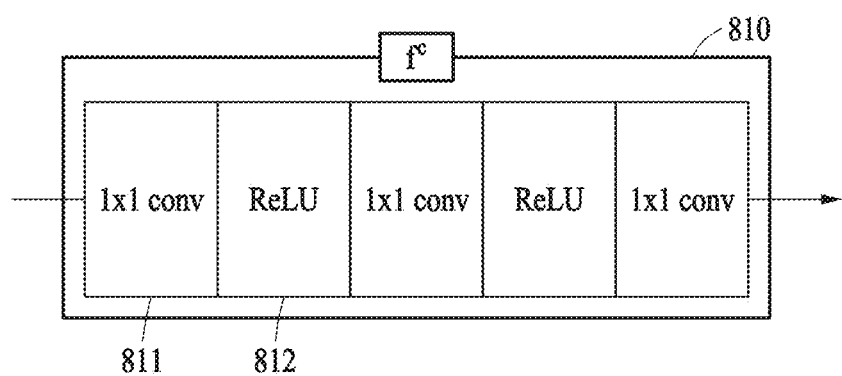
FIG. 8 illustrates an example of a configuration of an architecture control network.

FIG. 8 illustrates an example of a configuration of an architecture control network. Referring to FIG. 8, an architecture control network 810 ($f^c$) includes, for example, a convolution layer 811 and an activation function 812, and may be configured as a fully connected network. $f^c$ may adaptively modify a network architecture of $f^s$. $f^c$ may be defined as represented by Equation 6.

$$z_{m,n}{}^s = f_n{}^c(t_m) \quad \text{Equation 6}$$

In Equation 6, $f_n{}^c$ denotes an architecture control network of an nth channel selector. $z_m{}^s$ denotes a task preference for a channel, and may be a function of $t_m$ because each task vector adaptively activates a channel in a supernetwork.

Referring back to FIG. 6, to search for a task-agnostic layer, a preference $z_{n,c}{}^a$ for each channel may be determined by collecting a preference $z_{m,n,c}{}^s$ for each channel from tasks throughout entire training, as represented by Equation 7 below.

$$z_{n,c}^a \leftarrow (1-\alpha) \cdot z_{n,c}^a + \alpha \cdot \frac{1}{M} \cdot \sum_{m=1}^{M} z_{m,n,c}^s \quad \text{Equation 7}$$

In Equation 7, $z^a$ may be initialized to a value of 0. c denotes a channel index of an nth channel selection module, and a denotes a hyperparameter of an exponential moving average. $z^a$ may be used to estimate an agreement of tasks in a mini-batch of the size of M with respect to a preference for each channel by calculating an agreement criterion as represented by Equation 8.

$$\frac{1}{M} \cdot \sum_{m=1}^{M} \sum_{c=1}^{C} g(z_{m,n,c}^s) \cdot g(z_{n,c}^a) > \gamma \cdot \sum_{c=1}^{C} g(z_{n,c}^a) \quad \text{Equation 8}$$

In Equation 8, γ denotes a threshold hyperparameter. A Boolean variable η may indicate whether Equation 8 is established. When Equation 8 is established, for example, η=1, most tasks may agree to prune channels and share a layer. However, a condition of Equation 8 may be established or not be established depending on a task in a current training mini-batch. Thus, similar to Equation 7, η may be accumulated through $S_n$ throughout training to obtain an agreement of tasks from an entire dataset, as represented by Equation 9.

$$s_n \leftarrow (1-\alpha) \cdot s_n + \alpha \cdot \mathbb{1}[\eta] \quad \text{Equation 9}$$

In Equation 9, $S_n$ may be initialized to 0. A greater value of $S_n$ may indicate that a greater number of tasks may agree on a preference for an nth channel and a greater number of strategies may prefer an nth channel selection module becoming task-agnostic. A task-agnostic layer may be positioned at an initial stage of a network, enabling the reuse of a feature between tasks. For example, in a case in which all the nth channel selector and previous channel selectors have $S_i$ that is greater than the given threshold γ as represented by Equation 10, the nth channel selection module may be task-agnostic. This may be represented by Equation 10.

$$\phi_n = \begin{cases} 1 & \text{if } s_i > \gamma, \forall i = 1, 2, \sim, n \\ 0 & \text{otherwise} \end{cases} \quad \text{Equation 10}$$

In Equation 10, $\varphi \in \mathbb{Z}_2^N$ denotes a determinant. In a case in which the nth channel selector is task-agnostic, an nth component $\phi_n$ may be 1.

To search for an effective architecture, a regularization term may be used. $\mathcal{L}_{(\cdot, \cdot)}$ denotes a standard $\ell_1$ loss function for an image restoration task. A resource regularization function $\mathcal{R}_{1(\cdot)}$ may calculate a resource amount of a currently retrieved architecture by Equation 4. A regularization function $\mathcal{R}_2$ may be used to maximize the number of task-agnostic layers for a more effective generation of various image effects. An overall objective function may be represented by Equation 11.

$$\min_{\theta,\psi} \mathcal{L}(\theta, \psi) + \lambda_1 \cdot \mathcal{R}_1(\psi) + \lambda_2 \cdot \mathcal{R}_2(\psi) \quad \text{[Equation 11]}$$

In Equation 11, θ denotes a learnable parameter of a restoration network f (e.g., $f^c$ and $f^a$), and ψ denotes a learnable parameter of an architecture control network $f^c$. $\lambda_1$ and $\lambda_2$ denote hyperparameters for a balance of these. To allow a network to be task-agnostic with a less (or least) expense of performance, $\mathcal{R}_2$ may assign a penalty to a disagreement between tasks on a channel importance, as represented by Equation 12.

$$\mathcal{R}_2(\psi) = \sum_{n=1}^{N} \phi_{n-1} \cdot \sum_{c=1}^{C} \sum_{m=1}^{M} \|g(z_{m,n,c}^s) - g(z_{n,c}^a)\|_1 \quad \text{[Equation 12]}$$

In Equation 12, a layer of which n=0 may indicate an input image, and $\phi_0=1$ because the input image is shared with respect to various image effects of a given task. In Equation 11, $\mathcal{L}$ may correspond to a first loss component associated with a restoration performance, and $\mathcal{R}_1$ and $\mathcal{R}_2$ may correspond to a second loss component associated with a computation amount. The first loss component may be used to train a source neural network such that a difference between a training target image and a restoration image is reduced. The second loss component may be used to train the source neural network such that the number of layers included in a task-agnostic architecture increases and the computation amount is thus reduced.

Figure 9:
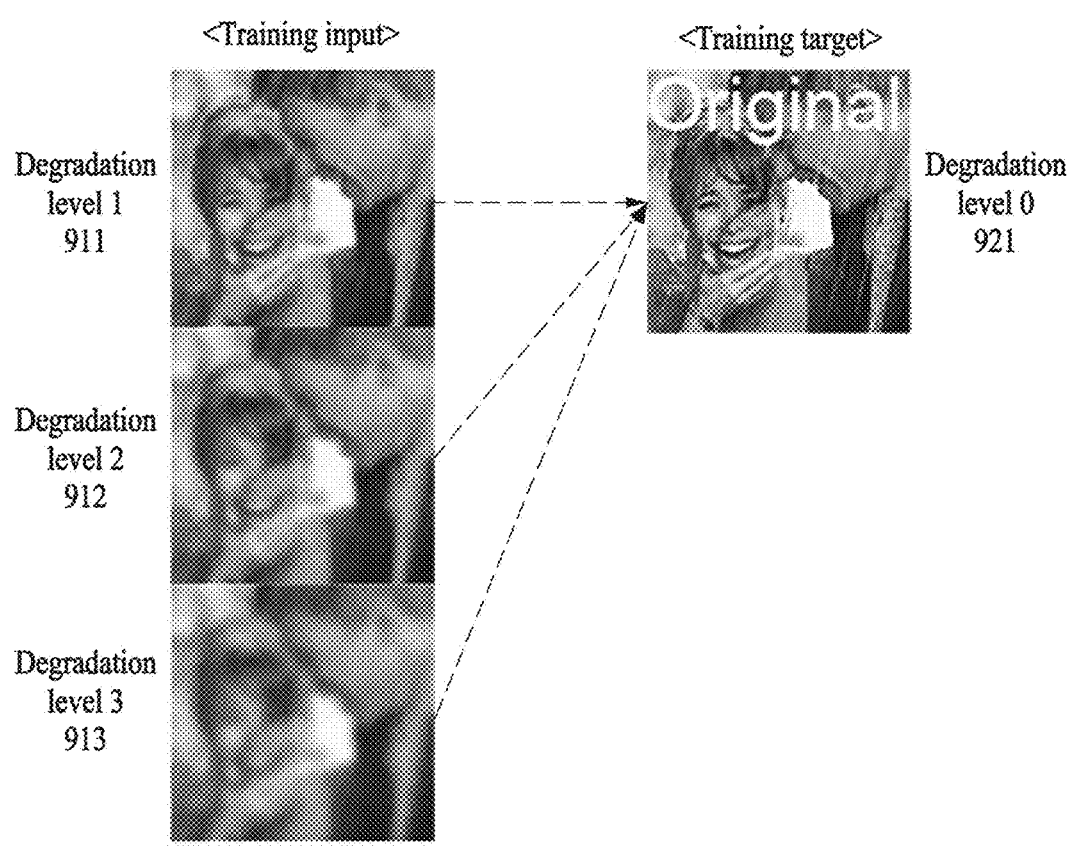
FIG. 9 illustrates an example of a training dataset having an absolute target.

FIG. 9 illustrates an example of a training dataset having an absolute target. A typical image restoration operation may be defined as restoring a degraded image of various degradation levels to an original image. For example, even though training input images 911 through 913 have different degradation levels, for example, degradation levels 1 through 3, the training input images 911 may form respective training pairs with a training target image 921 of the same degradation level, for example, degradation level 0. In the example of FIG. 9, the training target image 921 may correspond to an absolute target.

Figure 10:
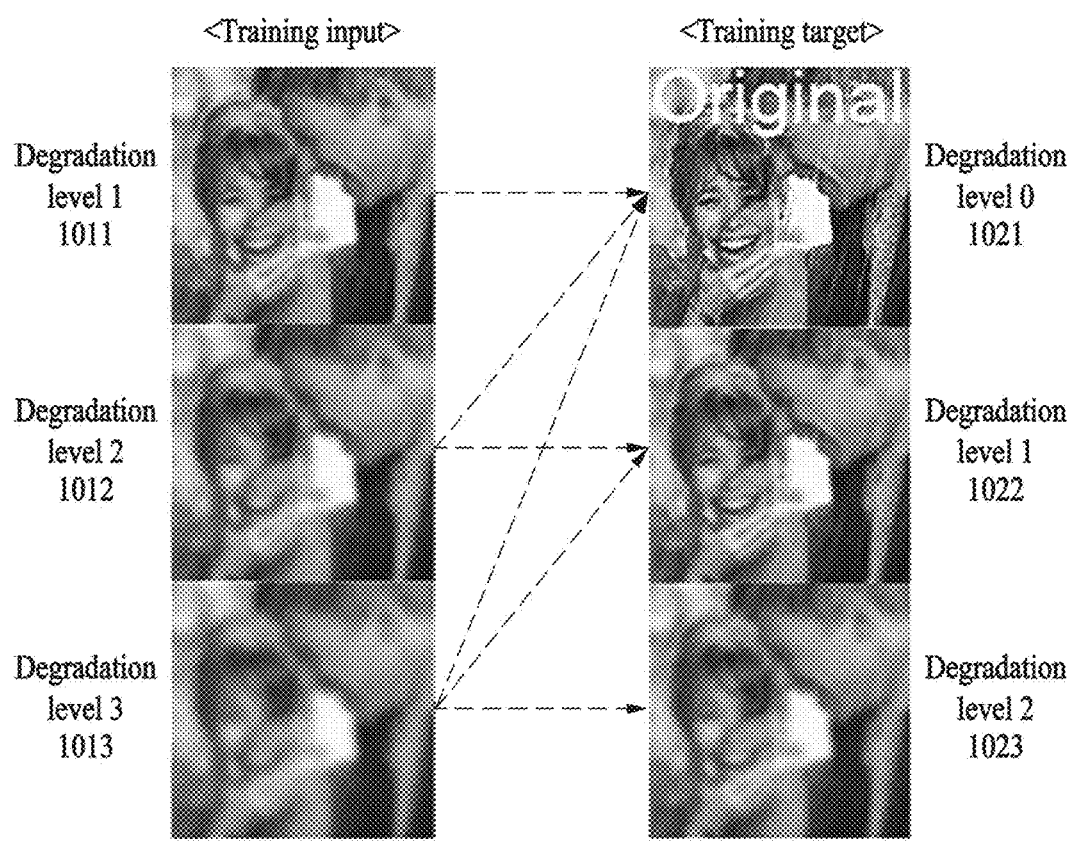
FIG. 10 illustrates an example of a training dataset having a relative target.
Figure 11:
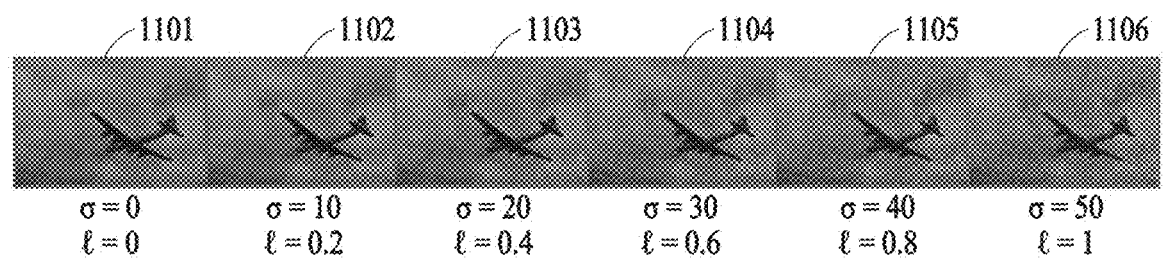
FIG. 11 illustrates an example of a configuration of a training dataset.

FIG. 10 illustrates an example of a training dataset having a relative target. FIG. 11 illustrates an example of a configuration of a training dataset. Controllable image restoration may aim to generate various visually satisfactory image effects. However, such an objective may not be achieved based on a typical training method that is focused on restoration to a single original image. In an example, a restoration task may be re-defined as assigning various effects by controlling a degradation (or effect) level. For example, each of training input images 1011, 1012, and 1013 may be paired with any one of training target images 1021, 1022, and 1023. In the example of FIG. 10, each of the training target images 1021, 1022, and 1023 may correspond to a relative target.

A degree of restoration may be given as a control level that indicates a difference in level between an input and a target. For example, restoring the training input image 1011 to the training target image 1021, restoring the training input image 1012 to the training target image 1022, and restoring the training input image 1013 to the training target image 1023 may correspond to a control level of 0. In addition, restoring the training input image 1012 to the training target image 1021 and restoring the training input image 1013 to the training target image 1022 may correspond to a control level of 1. In addition, restoring the training input image 1013 to the training target image 1021 may correspond to a control level of 2. Conversely, there may also be control levels of −1 and −2 for an addition of a degradation effect. Based on such a control level, a task vector $t_m$ may be defined as represented by Equation 13.

$$t_{m,d} = l_d^{in} - l_d^{gt} \quad \text{Equation 13}$$

In Equation 13, $l^{in}$, $l^{gt} \in \mathbb{R}^D$ denote a degradation or effect level of an input image and a target image, respectively. For a dth degradation type, it may be defined as $l_d^{in}$, $l_d^{gt} \in [0, 1]$. For example, referring to FIG. 11, images 1101 through 1106 may have noise with a standard deviation σ=0 to 50. Based on such noise, a degradation level I=0 to 1 may be assigned to the images 1101 through 1106. A case in which $l_d^{gt} < l_d^{in}$ may correspond to a scenario in which a target image is less degraded than an input image, that is, a scenario in which the input image is restored to the target image of a higher quality. In contrast, a case in which $l_d^{gt} > l_d^{in}$ may correspond to a scenario in which the target image is more degraded than the input image, that is, a scenario in which a degradation effect is added to the input image.

For example, in a case in which the second image 1102 corresponds to a first training input image and the fourth image 1104 corresponds to a first training target image, a first task vector may indicate a first image effect that reduces a noise level by 0.4. In this example, the first training input image, the first task vector, and the first training target image may form a first training set. For example, in a case in which the third image 1103 corresponds to a second training input image and the fifth image 1105 corresponds to a second training target image, a second task vector may indicate a second image effect that reduces a noise level by 0.4. In this example, the second training input image, the second task vector, and the second training target image may form a second training set. In these examples, a difference between an input effect level of the second training input image and a target effect level of the second training target image may be the same as a difference between an input effect level of the first training input image and a target effect level of the first training target image. Thus, the first task vector and the second task vector may have the same value, and the first task vector and the second task vector may accordingly set a direction for training with a relative target which is a level difference of 0.4. For each mini-batch, training image pairs may be sampled in the same way with respect to a uniform distribution for a single degradation type, a binary distribution for all degradation types, and a uniform distribution for all degradation types.

Figure 12:
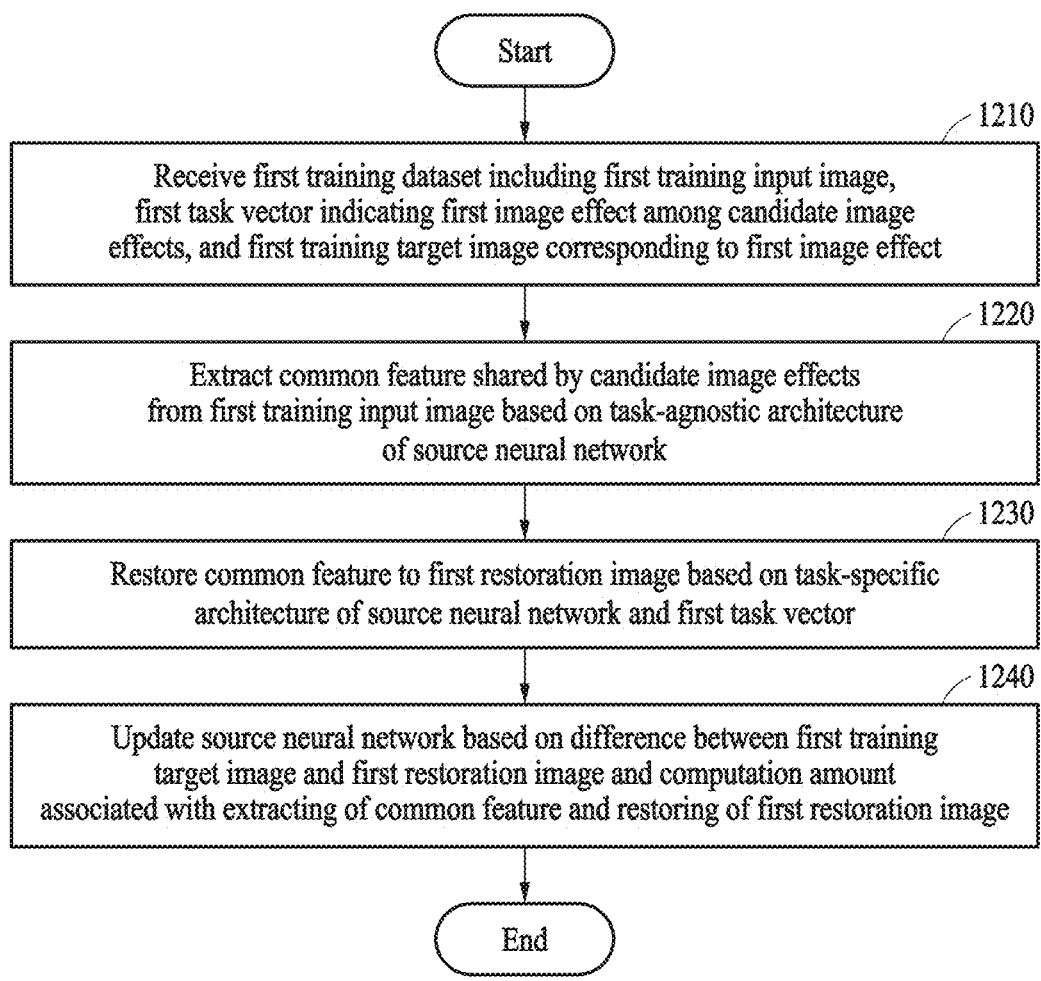
FIG. 12 illustrates an example of a training method based on a first training dataset.

FIG. 12 illustrates an example of a training method based on a first training dataset. Operations 1210 through 1240 to be described hereinafter with reference to FIG. 12 may be performed sequentially or non-sequentially. For example, the order in which operations 1210 through 1240 are performed may be changed and/or at least two of operations 1210 through 1240 may be performed in parallel. Operations 1210 through 1240 may be performed by at least one component (e.g., the processor 510 of FIG. 5 and a processor 1410 of FIG. 14) included in a training apparatus (e.g., the training apparatus 500 of FIG. 5) and/or an electronic apparatus (e.g., an electronic apparatus 1400 of FIG. 14). Hereinafter, operations 1210 through 1240 will be described as being performed by a training apparatus for simplicity of description.

Referring to FIG. 12, in operation 1210, the training apparatus receives a first training dataset including a first training input image, a first task vector indicating a first image effect among a plurality of candidate image effects, and a first training target image corresponding to the first image effect. In operation 1220, the training apparatus extracts a common feature shared by the candidate image effects from the first training input image based on a task-agnostic architecture of a source neural network. In operation 1230, the training apparatus restores the common feature to a first restoration image based on a task-specific architecture of the source neural network and the first task vector. In operation 1240, the training apparatus updates the source neural network based on a difference between the first training target image and the first restoration image and a computation amount associated with the extracting of the common feature and the restoring of the first restoration image. For example, the source neural network may be updated such that the number of layers included in the task-agnostic architecture increases and the computation amount is reduced accordingly.

The first task vector may include a control level of each effect type of the first image effect, and a value of the control level may be determined by a difference between an input effect level of the first training input image and a target effect level of the first training target image. For example, in a case in which there is a second training dataset including a second training input image, a second task vector indicating a second image effect, and a second training target image corresponding to the second image effect, and a difference between an input effect level of the second training input image and a target effect level of the second training target image is the same as the difference between the input effect level of the first training input image and the target effect level of the first training target image, the second task vector may have the same value as the first task vector. For a more detailed description of the training, reference may be made to that which is described above with reference to FIGS. 1 through 11, 13, and 14.

Figure 13:
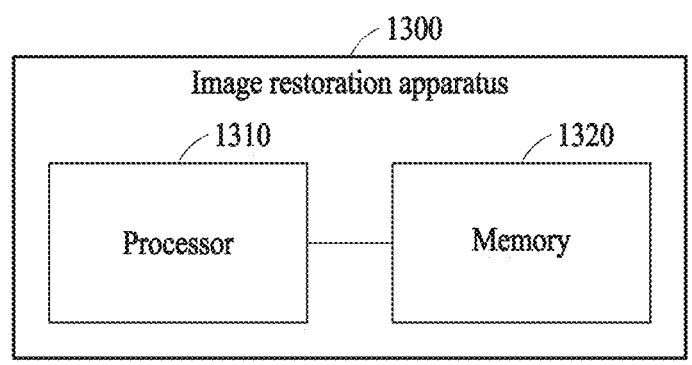
FIG. 13 illustrates an example of an image restoration apparatus.

FIG. 13 illustrates an example of an image restoration apparatus. Referring to FIG. 13, an image restoration apparatus 1300 may include, for example, a processor 1310 and a memory 1320. The memory 1320 may be connected to the processor 1310, and may store instructions executable by the processor 1310, and data to be processed by the processor 1310 or data processed by the processor 1310. The memory 1320 may include a non-transitory computer-readable medium, for example, a high-speed random-access memory (RAM) and/or nonvolatile computer-readable storage medium (e.g., at least one disk storage device, flash memory device, or other nonvolatile solid-state memory device).

The processor 1310 may execute the instructions stored in the memory 1320 to perform the operations described above with reference to FIGS. 1 through 12 and 14. In an example, the processor 1310 may receive an input image and a first task vector indicating a first image effect among a plurality of candidate image effects, extract a common feature shared by the candidate image effects from the input image based on a task-agnostic architecture of a source neural network, and restore the common feature to a first restoration image corresponding to the first image effect based on a task-specific architecture of the source neural network and the first task vector. For a more detailed description of the image restoration apparatus 1300, reference may be made to that which is described with reference to FIGS. 1 through 12 and 14.

Figure 14:
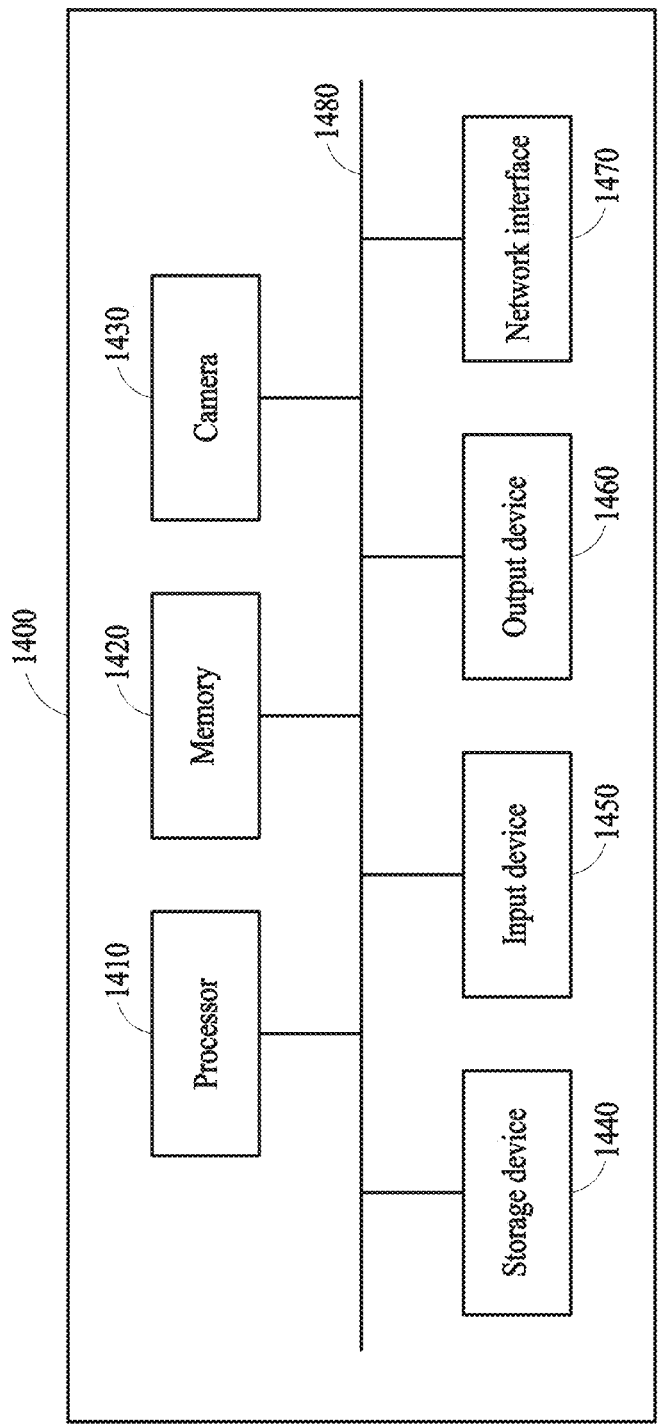
FIG. 14 illustrates an example of an electronic apparatus.

FIG. 14 illustrates an example of an electronic apparatus. Referring to FIG. 14, an electronic apparatus 14 may include, for example, a processor 1410, a memory 1420, a camera 1430, a storage device 1440, an input device 1450, an output device 1460, and a network interface 1470. These components may communicate with one another through a communication bus 1480. For example, the electronic apparatus 1400 may be embodied as at least a portion of a mobile device (e.g., a mobile phone, a smartphone, a personal digital assistant (PDA), a netbook, a tablet computer, a laptop computer, etc.), a wearable device (e.g., a smartwatch, a smart band, smart eyeglasses, etc.), a computing device (e.g., a desktop, a server, etc.), a home appliance (e.g., a television (TV), a smart TV, a refrigerator, etc.), a security device (e.g., a door lock, etc.), or a vehicle (e.g., a smart vehicle, etc.). The electronic apparatus 1400 may structurally and/or functionally include any one or any combination of any two or more of the image restoration apparatus 100 of FIG. 1, the training apparatus 500 of FIG. 5, and the image restoration apparatus 1300 of FIG. 13.

The processor 1410 may execute functions and instructions to be executed in the electronic apparatus 1400. For example, the processor 1410 may process instructions stored in the memory 1420 or the storage device 1440. The processor 1410 may perform one or more, or all, of the operations or methods described above with reference to FIGS. 1 through 13. In an example, the processor 1410 may receive an input image and a first task vector indicating a first image effect among a plurality of candidate image effects, extract a common feature shared by the candidate image effects from the input image based on a task-agnostic architecture of a source neural network, and restore the common feature to a first restoration image corresponding to the first image effect based on a task-specific architecture of the source neural network and the first task vector. The memory 1420 may include a computer-readable storage medium or device. The memory 1420 may store the instructions to be executed by the processor 1410, and store related information during the execution of software and/or an application by the electronic apparatus 1400.

The camera 1430 may generate an input image (e.g., a photo and/or video). The storage device 1440 may include a computer-readable storage medium or device. The storage device 1440 may store a greater amount of information than the memory 1420 and store the information for a long period of time. The storage device 1440 may include, for example, a magnetic hard disk, an optical disc, a flash memory, a floppy disk, or a nonvolatile memory of another form that is known in the relevant technical field.

The input device 1450 may receive an input from a user by a traditional input method through a keyboard and a mouse, and by a more contemporary input method, such as, for example, a touch input, a voice input, and an image input. The input device 1450 may include, for example, a keyboard, a mouse, a touchscreen, a microphone, and/or other devices that may detect the input from the user and transfer the detected input to the electronic apparatus 1400. The output device 1460 may provide an output of the electronic apparatus 1400 to a user through a visual, auditory, or tactile channel. The output device 1460 may include, for example, a display, a touchscreen, a speaker, a vibration generator, and/or other devices that may provide the output to the user. The network interface 1470 may communicate with an external device through a wired or wireless network.

The image restoration apparatus 100, the source neural networks 200, 530, and 600, the task-agnostic architectures 201 and 610, the task-specific architectures 202, 310, and 620, the first modified network 210, the task-agnostic networks 211 and 221, the task-specific network 212, the second modified network 220, the second task-specific network 222, the control architecture 320, the first architecture control network 321, the second architecture control network 322, the n$^{th}$ architecture control network 323, the training apparatus 500, the processors 510, 1310, and 1410, the memories 520, 1320, and 1420, the control architecture 630, the channel selector 710, the architecture control network 810, the image restoration apparatus 1300, the electronic apparatus 1400, the storage device 1440, the input device 1450, the output device 1460, the network interface 1470, the communication bus 1480, and other apparatuses, devices, units, modules, and components described herein with respect to FIGS. 1-14 are implemented by hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 1-14 that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control a processor or computer to implement the hardware components and perform the methods as described above are written as computer programs, code segments, instructions or any combination thereof, for individually or collectively instructing or configuring the processor or computer to operate as a machine or special-purpose computer to perform the operations performed by the hardware components and the methods as described above. In one example, the instructions or software include machine code that is directly executed by the processor or computer, such as machine code produced by a compiler. In another example, the instructions or software include higher-level code that is executed by the processor or computer using an interpreter. Programmers of ordinary skill in the art can readily write the instructions or software based on the block diagrams and the flow charts illustrated in the drawings and the corresponding descriptions in the specification, which disclose algorithms for performing the operations performed by the hardware components and the methods as described above.

The instructions or software to control a processor or computer to implement the hardware components and perform the methods as described above, and any associated data, data files, and data structures, are recorded, stored, or fixed in or on one or more non-transitory computer-readable storage media. Examples of a non-transitory computer-readable storage medium include read-only memory (ROM), random-access programmable read only memory (PROM), electrically erasable programmable read-only memory (EEPROM), random-access memory (RAM), dynamic random access memory (DRAM), static random access memory (SRAM), flash memory, non-volatile memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, blue-ray or optical disk storage, hard disk drive (HDD), solid state drive (SSD), flash memory, a card type memory such as multimedia card micro or a card (for example, secure digital (SD) or extreme digital (XD)), magnetic tapes, floppy disks, magneto-optical data storage devices, optical data storage devices, hard disks, solid-state disks, and any other device that is configured to store the instructions or software and any associated data, data files, and data structures in a non-transitory manner and providing the instructions or software and any associated data, data files, and data structures to a processor or computer so that the processor or computer can execute the instructions.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A processor-implemented method, comprising:
    extracting a common feature shared by candidate image effects from an input image, based on a task-agnostic architecture of a source neural network; and
    restoring the common feature to a first restoration image corresponding to a first image effect, based on a task-specific architecture of the source neural network and a first task vector that indicates the first image effect from among the candidate image effects.

2. The method of claim 1, wherein the restoring comprises:
    determining a first task-specific network by applying the first task vector to the task-specific architecture; and
    restoring the common feature to the first restoration image, based on the first task-specific network.

3. The method of claim 2, wherein the restoring comprises:
    extracting a first specific feature specific to the first image effect from the common feature, based on the first task-specific network; and
    restoring the first specific feature to the first restoration image, based on the first task-specific network.

4. The method of claim 2, wherein the determining of the first task-specific network comprises:
    generating first channel selection information corresponding to the first task vector using an architecture control network; and
    determining the first task-specific network by removing a portion of channels of the task-specific architecture, based on the first channel selection information.

5. The method of claim 4, wherein the generating of the first channel selection information comprises:
    generating a first real vector by processing the first task vector through the architecture control network; and
    generating the first channel selection information by transforming each real element of the first real vector into true or false through a transformation function.

6. The method of claim 1, wherein the extracting comprises:
    determining a task-agnostic network by applying a shared parameter to the task-agnostic architecture; and
    extracting the common feature from the input image, based on the task-agnostic network.

7. The method of claim 1, further comprising:
    restoring the common feature to a second restoration image corresponding to a second image effect, based on the task-specific architecture and a second task vector that indicates the second image effect from among the candidate image effects,
    wherein the common feature is reused for the restoring of the second restoration image.

8. The method of claim 1, wherein the first task vector comprises a control level of each effect type among effect types of the first image effect.

9. A non-transitory computer-readable storage medium storing instructions that, when executed by one or more processors, cause the one or more processors to perform the method of claim 1.

10. A processor-implemented method, comprising:
    extracting a common feature shared by candidate image effects from a first training input image, based on a task-agnostic architecture of a source neural network;
    restoring the common feature to a first restoration image corresponding to a first image effect, based on a task-specific architecture of the source neural network and a first task vector that indicates the first image effect from among the candidate image effects; and
    updating the source neural network, based on a difference between a first training target image and the first restoration image, and a computation amount associated with the extracting of the common feature and the restoring of the first restoration image.

11. The method of claim 10, wherein the updating of the source neural network comprises:

updating the source neural network such that a number of layers comprised in the task-agnostic architecture increases and the computation amount decreases.

12. The method of claim 10, wherein the first task vector comprises a control level of each effect type among effect types of the first image effect, and wherein a value of the control level is determined by a difference between an input effect level of the first training input image and a target effect level of the first training target image.

13. The method of claim 11, wherein the first training input image, the first task vector, and the first target image are comprised in a first training dataset, wherein a second training dataset comprises a second training input image, a second task vector indicating a second image effect among the candidate image effects, and a second training target image corresponding to the second image effect, wherein a difference between an input effect level of the second training input image and a target effect level of the second training target image is the same as the difference between the input effect level of the first training input image and the target effect level of the first training target image, and wherein the second task vector has a same value as the first task vector.

14. A non-transitory computer-readable storage medium storing instructions that, when executed by one or more processors, cause the one or more processors to perform the method of claim 10.

15. An electronic apparatus, comprising:

one or more processors configured to:
extract a common feature shared by candidate image effects from an input image, based on a task-agnostic architecture of a source neural network; and
restore the common feature to a first restoration image corresponding to a first image effect, based on a task-specific architecture of the source neural network and a first task vector that that indicates the first image effect from among the candidate image effects.

16. The electronic apparatus of claim 15, wherein the one or more processors are further configured to:

determine a first task-specific network by applying the first task vector to the task-specific architecture; and
restore the common feature to the first restoration image, based on the first task-specific network.

17. The electronic apparatus of claim 16, wherein the one or more processors are further configured to:

extract a first specific feature that is specific to the first image effect from the common feature, based on the first task-specific network; and
restore the first specific feature to the first restoration image corresponding to the first image effect based on the first task-specific network.

18. The electronic apparatus of claim 16, wherein the one or more processors are further configured to:

generate first channel selection information corresponding to the first task vector using an architecture control network; and
determine the first task-specific network by removing a portion of channels of the task- specific architecture, based on the first channel selection information.

19. The electronic apparatus of claim 18, wherein the one or more processors are further configured to:

generate a first real vector by processing the first task vector through the architecture control network; and
generate the first channel selection information by transforming each real element among real elements of the first real vector into true or false through a transformation function.

20. The electronic apparatus of claim 15, wherein the one or more processors are further configured to:

determine a task-agnostic network by applying a shared parameter to the task-agnostic architecture; and
extract the common feature from the input image, based on the task-agnostic network.

21. The electronic apparatus of claim 15, wherein the one or more processors are further configured to:

restore the common feature to a second restoration image corresponding to a second image effect, based on the task-specific architecture and a second task vector corresponding to the second image effect among the candidate image effects, and
wherein the common feature is reused for the restoring of the second restoration image.

22. The electronic apparatus of claim 15, further comprising a camera configured to generate the input image.

23. An electronic apparatus, comprising:

one or more processors configured to:
extract a common feature shared by candidate image effects from an input image, using a task-agnostic neural network;
generate a first task-specific network by removing one or more channels of a task-specific architecture, based on a first task vector that indicates a first image effect among the candidate image effects;
extract, from the common feature, a first specific feature that is specific to the first image effect, using the first task-specific neural network; and
restore the first specific feature to a first restoration image, using the first task- specific neural network.

24. The electronic apparatus of claim 23, wherein the one or more processors are further configured to generate the task-agnostic network by applying a shared parameter to a task-agnostic architecture.

25. The electronic apparatus of claim 23, wherein the one or more processors are further configured to generate a first real vector by processing the first task vector through an architecture control network; and generate first channel selection information used to remove the one or more channels of the task-specific architecture, by transforming each real element among real elements of the first real vector through a transformation function.

26. The electronic apparatus of claim 23, wherein the one or more processors are further configured to:

generate a second task-specific network by removing one or more other channels of the task-specific architecture, based on a second task vector that indicates a second image effect among the candidate image effects;
extract, from the common feature, a second specific feature that is specific to the second image effect, using second task-specific neural network; and
restore the second specific feature to a second restoration image, using the second task-specific neural network.

27. The method of claim 1, further comprising:

extracting a training common feature shared by training candidate image effects from a training first input image, based on a task-agnostic architecture of an in-training source neural network;

restoring the training common feature to a training first restoration image corresponding to a first training image effect, based on a task-specific architecture of the in-training source neural network and a training first task vector that indicates the training first image effect from among the training candidate image effects; and generating the source neural network by updating the in-training source neural network, based on a difference between a first training target image and the training first restoration image, and a computation amount associated with the extracting of the training common feature and the restoring of the training first restoration image, wherein the first training input image, the first task vector, and the first target image are comprised in a first training dataset.

28. The method of claim 27, wherein the updating of the in-training source neural includes updating the in-training source neural network such that a number of layers comprised in the task-agnostic architecture of the in-training source neural network increases and the computation amount decreases.

29. The method of claim 10, further comprising using the updated source neural network by an electronic device to generate another first restoration image, corresponding to another first image effect, from an input image captured by a camera of the electronic device.

* * * * *